(12) United States Patent (10) Patent No.: US 8,619,035 B2
Ciesla et al. (45) Date of Patent: Dec. 31, 2013

(54) METHOD FOR ASSISTING USER INPUT TO A DEVICE

(75) Inventors: Craig Michael Ciesla, Mountain View, CA (US); Micah B. Yairi, Daly City, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 108 days.

(21) Appl. No.: 13/024,241

(22) Filed: Feb. 9, 2011

(65) Prior Publication Data

US 2012/0032886 A1 Feb. 9, 2012

Related U.S. Application Data

(60) Provisional application No. 61/303,214, filed on Feb. 10, 2010.

(51) Int. Cl.
*G06F 3/02* (2006.01)
(52) U.S. Cl.
USPC .................. 345/168; 345/156; 340/407.2
(58) Field of Classification Search
USPC ................. 345/156–184; 340/407.2
See application file for complete search history.

(56) References Cited

U.S. PATENT DOCUMENTS

| 3,034,628 | A | 5/1962 | Wadey |
|---|---|---|---|
| 3,659,354 | A | 5/1972 | Sutherland |
| 3,759,108 | A | 9/1973 | Borom et al. |
| 3,780,236 | A | 12/1973 | Gross |
| 3,818,487 | A | 6/1974 | Brody et al. |
| 4,109,118 | A * | 8/1978 | Kley ............... 200/5 E |
| 4,209,819 | A | 6/1980 | Seignemartin |
| 4,290,343 | A | 9/1981 | Gram |
| 4,307,268 | A * | 12/1981 | Harper ............ 200/5 A |

(Continued)

FOREIGN PATENT DOCUMENTS

| JP | 10255106 | 9/1998 |
|---|---|---|
| JP | 2006268068 A | 10/2006 |

(Continued)

OTHER PUBLICATIONS

Optical Society of America, Optics Express; vol. 12, No. 11. May 31, 2004, 7 Pages, Jeong, Ki-Hun, et al. "Tunable Microdoublet Lens Array".

(Continued)

*Primary Examiner* — Amare Mengistu
*Assistant Examiner* — Sarvesh J Nadkarni
(74) *Attorney, Agent, or Firm* — Jeffrey Schox (57) ABSTRACT

A method for assisting user input to a device, comprising the steps of providing a user interface to retrieve a user input, providing a tactile interface layer that defines a surface and includes a volume of fluid and a displacement device that manipulates the volume of fluid to deform a plurality of particular regions of the surface into tactilely distinguishable formations that each represent a key of a key interface, allowing the user to provide input through the key interface, predicting a subsequent key input when a user provides an input through the key interface, and manipulating the volume of fluid to deform the plurality of particular regions into one of two types of tactilely distinguishable formations: a first type for tactilely distinguishable formations that represent a predicted key and a second type for tactilely distinguishable formations that represent an unpredicted key.

22 Claims, 5 Drawing Sheets

(56) References Cited

U.S. PATENT DOCUMENTS

| | | |
|---|---|---|
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,700,025 A | 10/1987 | Hatayama et al. |
| 4,920,343 A | 4/1990 | Schwartz |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A * | 3/1996 | Garner ............... 434/114 |
| 5,666,112 A | 9/1997 | Crowley et al. |
| 5,717,423 A * | 2/1998 | Parker ................. 345/108 |
| 5,729,222 A * | 3/1998 | Iggulden et al. ....... 341/31 |
| 5,742,241 A * | 4/1998 | Crowley et al. ........ 341/22 |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A * | 6/1999 | Thornton ............ 379/433.07 |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 * | 3/2002 | Vale .................. 341/23 |
| 6,366,272 B1 | 4/2002 | Rosenberg et al. |
| 6,369,803 B2 * | 4/2002 | Brisebois et al. ........ 345/173 |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,573,844 B1 * | 6/2003 | Venolia et al. .......... 341/22 |
| 6,636,202 B2 | 10/2003 | Ishmael, Jr. et al. |
| 6,639,581 B1 | 10/2003 | Moore et al. |
| 6,655,788 B1 | 12/2003 | Freeman |
| 6,657,614 B1 * | 12/2003 | Ito et al. ............. 345/168 |
| 6,667,738 B2 | 12/2003 | Murphy |
| 6,681,031 B2 | 1/2004 | Cohen et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 * | 3/2004 | Tecu et al. ........... 340/407.1 |
| 6,743,021 B2 | 6/2004 | Prince et al. |
| 6,788,295 B1 * | 9/2004 | Inkster ............... 345/175 |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 * | 11/2006 | Kinerk et al. ............ 345/156 |
| 7,138,985 B2 * | 11/2006 | Nakajima ............... 345/173 |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 * | 12/2006 | Taylor et al. ........... 345/168 |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,117 B2 | 4/2007 | Rosenberg et al. |
| 7,209,118 B2 | 4/2007 | Shahoian et al. |
| 7,210,160 B2 * | 4/2007 | Anderson et al. ........ 725/81 |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 * | 5/2007 | Marcus et al. ........... 345/169 |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 * | 7/2007 | Custy .................. 345/173 |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |

(56) References Cited

U.S. PATENT DOCUMENTS

| | | | |
|---|---|---|---|
| 7,336,260 B2 | 2/2008 | Martin et al. | |
| 7,336,266 B2 | 2/2008 | Hayward et al. | |
| 7,339,572 B2 | 3/2008 | Schena | |
| 7,339,580 B2 | 3/2008 | Westerman et al. | |
| 7,342,573 B2 | 3/2008 | Ryynanen | |
| 7,355,595 B2* | 4/2008 | Bathiche et al. | 345/173 |
| 7,369,115 B2* | 5/2008 | Cruz-Hernandez et al. | 345/156 |
| 7,382,357 B2* | 6/2008 | Panotopoulos et al. | 345/168 |
| 7,390,157 B2 | 6/2008 | Kramer | |
| 7,391,861 B2* | 6/2008 | Levy | 379/368 |
| 7,397,466 B2 | 7/2008 | Bourdelais et al. | |
| 7,403,191 B2 | 7/2008 | Sinclair | |
| 7,432,910 B2 | 10/2008 | Shahoian | |
| 7,432,911 B2 | 10/2008 | Skarine | |
| 7,432,912 B2 | 10/2008 | Cote et al. | |
| 7,433,719 B2 | 10/2008 | Dabov | |
| 7,471,280 B2 | 12/2008 | Prins | |
| 7,489,309 B2 | 2/2009 | Levin et al. | |
| 7,511,702 B2 | 3/2009 | Hotelling | |
| 7,522,152 B2 | 4/2009 | Olien et al. | |
| 7,545,289 B2 | 6/2009 | Mackey et al. | |
| 7,548,232 B2 | 6/2009 | Shahoian et al. | |
| 7,551,161 B2 | 6/2009 | Mann | |
| 7,561,142 B2 | 7/2009 | Shahoian et al. | |
| 7,567,232 B2 | 7/2009 | Rosenberg | |
| 7,567,243 B2 | 7/2009 | Hayward | |
| 7,589,714 B2 | 9/2009 | Funaki | |
| 7,592,999 B2 | 9/2009 | Rosenberg et al. | |
| 7,605,800 B2 | 10/2009 | Rosenberg | |
| 7,609,178 B2 | 10/2009 | Son et al. | |
| 7,659,885 B2 | 2/2010 | Kraus et al. | |
| 7,671,837 B2 | 3/2010 | Forsblad et al. | |
| 7,679,611 B2 | 3/2010 | Schena | |
| 7,679,839 B2 | 3/2010 | Polyakov et al. | |
| 7,688,310 B2 | 3/2010 | Rosenberg | |
| 7,701,438 B2 | 4/2010 | Chang et al. | |
| 7,728,820 B2 | 6/2010 | Rosenberg et al. | |
| 7,733,575 B2 | 6/2010 | Heim et al. | |
| 7,743,348 B2 | 6/2010 | Robbins et al. | |
| 7,755,602 B2 | 7/2010 | Tremblay et al. | |
| 7,808,488 B2 | 10/2010 | Martin et al. | |
| 7,834,853 B2 | 11/2010 | Finney et al. | |
| 7,843,424 B2 | 11/2010 | Rosenberg et al. | |
| 7,864,164 B2 | 1/2011 | Cunningham et al. | |
| 7,869,589 B1 | 1/2011 | Tuovinen | |
| 7,890,257 B2* | 2/2011 | Fyke et al. | 701/431 |
| 7,890,863 B2 | 2/2011 | Grant et al. | |
| 7,920,131 B2* | 4/2011 | Westerman | 345/173 |
| 7,924,145 B2 | 4/2011 | Yuk et al. | |
| 7,944,435 B2 | 5/2011 | Rosenberg et al. | |
| 7,952,498 B2 | 5/2011 | Higa | |
| 7,956,770 B2* | 6/2011 | Klinghult et al. | 341/20 |
| 7,973,773 B2 | 7/2011 | Pryor | |
| 7,978,181 B2* | 7/2011 | Westerman | 345/173 |
| 7,978,183 B2 | 7/2011 | Rosenberg et al. | |
| 7,978,186 B2 | 7/2011 | Vassallo et al. | |
| 7,979,797 B2 | 7/2011 | Schena | |
| 7,982,720 B2 | 7/2011 | Rosenberg et al. | |
| 7,986,303 B2* | 7/2011 | Braun et al. | 345/163 |
| 7,986,306 B2* | 7/2011 | Eich et al. | 345/173 |
| 7,989,181 B2 | 8/2011 | Blattner et al. | |
| 7,999,660 B2 | 8/2011 | Cybart et al. | |
| 8,002,089 B2 | 8/2011 | Jasso et al. | |
| 8,004,492 B2 | 8/2011 | Kramer et al. | |
| 8,013,843 B2 | 9/2011 | Pryor | |
| 8,020,095 B2 | 9/2011 | Braun et al. | |
| 8,022,933 B2* | 9/2011 | Hardacker et al. | 345/169 |
| 8,031,181 B2 | 10/2011 | Rosenberg et al. | |
| 8,044,826 B2 | 10/2011 | Yoo | |
| 8,047,849 B2 | 11/2011 | Ahn et al. | |
| 8,049,734 B2 | 11/2011 | Rosenberg et al. | |
| 8,059,104 B2 | 11/2011 | Shahoian et al. | |
| 8,059,105 B2 | 11/2011 | Rosenberg et al. | |
| 8,063,892 B2 | 11/2011 | Shahoian et al. | |
| 8,063,893 B2 | 11/2011 | Rosenberg et al. | |
| 8,068,605 B2 | 11/2011 | Holmberg | |
| 8,077,154 B2 | 12/2011 | Emig et al. | |
| 8,077,440 B2 | 12/2011 | Krabbenborg et al. | |
| 8,077,941 B2 | 12/2011 | Assmann | |
| 8,094,121 B2 | 1/2012 | Obermeyer et al. | |
| 8,094,806 B2* | 1/2012 | Levy | 379/368 |
| 8,103,472 B2 | 1/2012 | Braun et al. | |
| 8,106,787 B2* | 1/2012 | Nurmi | 340/665 |
| 8,115,745 B2 | 2/2012 | Gray | |
| 8,123,660 B2* | 2/2012 | Kruse et al. | 482/3 |
| 8,125,347 B2* | 2/2012 | Fahn | 340/815.4 |
| 8,125,461 B2 | 2/2012 | Weber et al. | |
| 8,130,202 B2 | 3/2012 | Levine et al. | |
| 8,144,129 B2 | 3/2012 | Hotelling et al. | |
| 8,144,271 B2 | 3/2012 | Han | |
| 8,154,512 B2* | 4/2012 | Olien et al. | 345/156 |
| 8,159,461 B2* | 4/2012 | Martin et al. | 345/169 |
| 8,162,009 B2 | 4/2012 | Chaffee | |
| 8,164,573 B2 | 4/2012 | Dacosta et al. | |
| 8,169,306 B2 | 5/2012 | Schmidt et al. | |
| 8,169,402 B2 | 5/2012 | Shahoian et al. | |
| 8,174,372 B2* | 5/2012 | da Costa | 340/407.2 |
| 8,174,495 B2 | 5/2012 | Takashima et al. | |
| 8,174,508 B2 | 5/2012 | Sinclair et al. | |
| 8,174,511 B2 | 5/2012 | Takenaka et al. | |
| 8,178,808 B2 | 5/2012 | Strittmatter | |
| 8,188,989 B2 | 5/2012 | Levin et al. | |
| 8,195,243 B2 | 6/2012 | Kim et al. | |
| 8,199,107 B2 | 6/2012 | Xu et al. | |
| 8,203,094 B2 | 6/2012 | Mittleman et al. | |
| 8,212,772 B2* | 7/2012 | Shahoian | 345/163 |
| 8,217,903 B2 | 7/2012 | Ma et al. | |
| 8,217,904 B2 | 7/2012 | Kim | |
| 8,224,392 B2 | 7/2012 | Kim et al. | |
| 8,228,305 B2 | 7/2012 | Pryor | |
| 8,232,976 B2 | 7/2012 | Yun et al. | |
| 8,253,052 B2 | 8/2012 | Chen | |
| 8,253,703 B2 | 8/2012 | Eldering | |
| 8,279,172 B2 | 10/2012 | Braun et al. | |
| 8,279,193 B1 | 10/2012 | Birnbaum et al. | |
| 8,310,458 B2 | 11/2012 | Faubert et al. | |
| 8,345,013 B2 | 1/2013 | Heubel et al. | |
| 8,350,820 B2 | 1/2013 | Deslippe et al. | |
| 8,362,882 B2 | 1/2013 | Heubel et al. | |
| 8,363,008 B2 | 1/2013 | Ryu et al. | |
| 8,367,957 B2 | 2/2013 | Strittmatter | |
| 8,368,641 B2 | 2/2013 | Tremblay et al. | |
| 8,378,797 B2 | 2/2013 | Pance et al. | |
| 8,384,680 B2 | 2/2013 | Paleczny et al. | |
| 8,390,594 B2 | 3/2013 | Modarres et al. | |
| 8,395,587 B2 | 3/2013 | Cauwels et al. | |
| 8,395,591 B2 | 3/2013 | Kruglick | |
| 8,400,402 B2 | 3/2013 | Son | |
| 8,400,410 B2 | 3/2013 | Taylor et al. | |
| 2001/0008396 A1 | 7/2001 | Komata | |
| 2001/0043189 A1 | 11/2001 | Brisebois et al. | |
| 2002/0106614 A1 | 8/2002 | Prince et al. | |
| 2002/0110237 A1 | 8/2002 | Krishnan | |
| 2003/0087698 A1 | 5/2003 | Nishiumi et al. | |
| 2003/0179190 A1* | 9/2003 | Franzen | 345/173 |
| 2003/0206153 A1 | 11/2003 | Murphy | |
| 2004/0056876 A1* | 3/2004 | Nakajima | 345/702 |
| 2004/0056877 A1 | 3/2004 | Nakajima | |
| 2004/0164968 A1 | 8/2004 | Miyamoto | |
| 2004/0178006 A1 | 9/2004 | Cok | |
| 2005/0007339 A1 | 1/2005 | Sato | |
| 2005/0007349 A1 | 1/2005 | Vakil et al. | |
| 2005/0020325 A1 | 1/2005 | Enger et al. | |
| 2005/0030292 A1 | 2/2005 | Diederiks | |
| 2005/0057528 A1 | 3/2005 | Kleen | |
| 2005/0088417 A1 | 4/2005 | Mulligan | |
| 2005/0110768 A1 | 5/2005 | Marriott et al. | |
| 2005/0162408 A1 | 7/2005 | Martchovsky | |
| 2005/0231489 A1 | 10/2005 | Ladouceur et al. | |
| 2005/0253816 A1* | 11/2005 | Himberg et al. | 345/173 |
| 2005/0285846 A1 | 12/2005 | Funaki | |
| 2006/0026521 A1 | 2/2006 | Hotelling et al. | |
| 2006/0097991 A1 | 5/2006 | Hotelling et al. | |
| 2006/0098148 A1 | 5/2006 | Kobayashi et al. | |

(56) References Cited

U.S. PATENT DOCUMENTS

| | | |
|---|---|---|
| 2006/0118610 A1 | 6/2006 | Pihlaja et al. |
| 2006/0119586 A1 | 6/2006 | Grant et al. |
| 2006/0197753 A1 | 9/2006 | Hotelling |
| 2006/0214923 A1* | 9/2006 | Chiu et al. .................... 345/173 |
| 2006/0238495 A1 | 10/2006 | Davis |
| 2006/0238510 A1* | 10/2006 | Panotopoulos et al. ........ 345/168 |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1* | 10/2007 | Hotelling ...................... 345/173 |
| 2007/0236469 A1 | 10/2007 | Woolley et al. |
| 2007/0247429 A1* | 10/2007 | Westerman .................... 345/168 |
| 2007/0254411 A1* | 11/2007 | Uhland et al. ................. 438/127 |
| 2007/0257634 A1 | 11/2007 | Leschin et al. |
| 2007/0273561 A1* | 11/2007 | Philipp ............................ 341/33 |
| 2007/0296702 A1 | 12/2007 | Strawn et al. |
| 2007/0296709 A1 | 12/2007 | Guanghai |
| 2008/0010593 A1* | 1/2008 | Uusitalo et al. ................ 715/702 |
| 2008/0024459 A1 | 1/2008 | Poupyrev et al. |
| 2008/0136791 A1 | 6/2008 | Nissar |
| 2008/0138774 A1 | 6/2008 | Ahn et al. |
| 2008/0143693 A1* | 6/2008 | Schena ........................... 345/179 |
| 2008/0150911 A1* | 6/2008 | Harrison ........................ 345/173 |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1* | 12/2008 | Woolf et al. ................... 345/163 |
| 2008/0303796 A1* | 12/2008 | Fyke ............................... 345/173 |
| 2009/0002140 A1* | 1/2009 | Higa ............................ 340/407.1 |
| 2009/0002205 A1 | 1/2009 | Klinghult et al. |
| 2009/0002328 A1* | 1/2009 | Ullrich et al. ................. 345/173 |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1* | 2/2009 | Lindberg et al. .............. 345/156 |
| 2009/0066672 A1* | 3/2009 | Tanabe et al. ................. 345/176 |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1* | 5/2009 | Grant et al. .................... 345/173 |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167677 A1 | 7/2009 | Kruse et al. |
| 2009/0167704 A1 | 7/2009 | Terlizzi et al. |
| 2009/0174673 A1* | 7/2009 | Ciesla ............................ 345/173 |
| 2009/0174687 A1* | 7/2009 | Ciesla et al. .................. 345/174 |
| 2009/0181724 A1 | 7/2009 | Pettersson |
| 2009/0182501 A1* | 7/2009 | Fyke et al. ..................... 701/208 |
| 2009/0195512 A1 | 8/2009 | Pettersson |
| 2009/0243998 A1 | 10/2009 | Wang |
| 2009/0250267 A1 | 10/2009 | Heubel et al. |
| 2009/0303022 A1 | 12/2009 | Griffin et al. |
| 2010/0043189 A1 | 2/2010 | Fukano |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0162109 A1* | 6/2010 | Chatterjee et al. ............. 715/702 |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0295820 A1 | 11/2010 | Kikin-Gil |
| 2010/0321335 A1 | 12/2010 | Lim et al. |
| 2011/0001613 A1 | 1/2011 | Ciesla et al. |
| 2011/0012851 A1 | 1/2011 | Ciesla et al. |
| 2011/0018813 A1 | 1/2011 | Kruglick |
| 2011/0029862 A1* | 2/2011 | Scott et al. ..................... 715/261 |
| 2011/0074691 A1* | 3/2011 | Causey et al. ................. 345/169 |
| 2011/0148793 A1 | 6/2011 | Ciesla et al. |
| 2011/0148807 A1 | 6/2011 | Fryer |
| 2011/0157080 A1 | 6/2011 | Ciesla et al. |
| 2011/0175838 A1 | 7/2011 | Higa |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2013/0019207 A1 | 1/2013 | Rothkopf et al. |

FOREIGN PATENT DOCUMENTS

| | | |
|---|---|---|
| JP | 2006285785 A | 10/2006 |
| WO | 2004028955 A | 4/2004 |
| WO | 2008037275 A1 | 4/2008 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS http://sharp-world.com/corporate/news/070831.html, Sharp Press Release, Aug. 31, 2007, 3 pages "Sharp Develops and Will Mass Produce New System LCD with Embedded Optical Sensors to Provide Input Capabilities Including Touch Screen and Scanner Functions".

* cited by examiner

METHOD FOR ASSISTING USER INPUT TO A DEVICE

CROSS-REFERENCE TO RELATED APPLICATIONS

This application claims the benefit of U.S. Provisional Application No. 61/303,214 filed on 10 Feb. 2010, which is incorporated in their entirety by this reference.

This application is related to U.S. application Ser. No. 11/969,848 filed on 4 Jan. 2008 and entitled "System and Method for Raised Touch Screens," U.S. application Ser. No. 12/319,334 filed on 5 Jan. 2009 and entitled "User Interface System," U.S. application Ser. No. 12/652,704 filed on 5 Jan. 2010 and entitled "User Interface System," and U.S. application Ser. No. 12/830,426 filed on 5 Jul. 2010 and entitled "Method for Adjusting the User Interface of a Device," which are each incorporated in their entirety by this reference.

TECHNICAL FIELD

This invention relates generally to touch sensitive user interfaces, and more specifically to a new and useful system and method for selectively raising portions of touch sensitive displays.

BACKGROUND

A substantial number of mobile devices such as cameras, mobile phones, laptops, tablet computers, etc. currently available in the market include an input interface. Some include a touch sensitive interface that have input interfaces that adapt to the application of the device, such as the touch sensitive display as seen in the Apple iPhone product, while others provide static keyboards such as those seen on the RIM Blackberry devices that provide substantial tactile guidance for keyboard text and/or number input, but are more difficult to adapt to the application of the device. While the tactile guidance provided by a static keyboard may facilitate input, other than the placement of the key and the tactile feedback provided by each key as a user provides an input, there is substantially little additional tactile assistance provided to the user in providing user input. For example, because of the generally small size of handheld devices available, static keyboards that are provided on such devices may be condensed to have a fewer number of keys where each key may represent more than one letter, number and/or any other type of input or to have substantially little or no space in between keys, which may increase difficulty for the user in providing input. For example, a user may intend to input the letter "y" on a QWERTY keyboard interface provided on a mobile device, but because of the proximity of the key for "y" to the key for "t," the letter "t" was mistakenly inputted. To provide further assistance to text, number, or any others suitable type of input, a device may provide visual assistance in the form of predictive text. For example, as the user inputs the letter "t," the device may suggest the word "the" on a display as a predicted input and the user may select to input the word "the" without typing all three letters of the word. However, this method of assistance is primarily visual and not tactile. In particular, in the previous example where the letter "t" was mistakenly inputted, the predictive text function may predict words that start with the letter "t" as opposed to the letter "y," potentially necessitating the user to delete the inputted letter "t" and restart the entry process.

Thus, there is a need in the user interface field to create an improved text, number, and/or any other suitable type of input interface that assist the user in inputting their desired input. This invention provides such an improved input interface.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
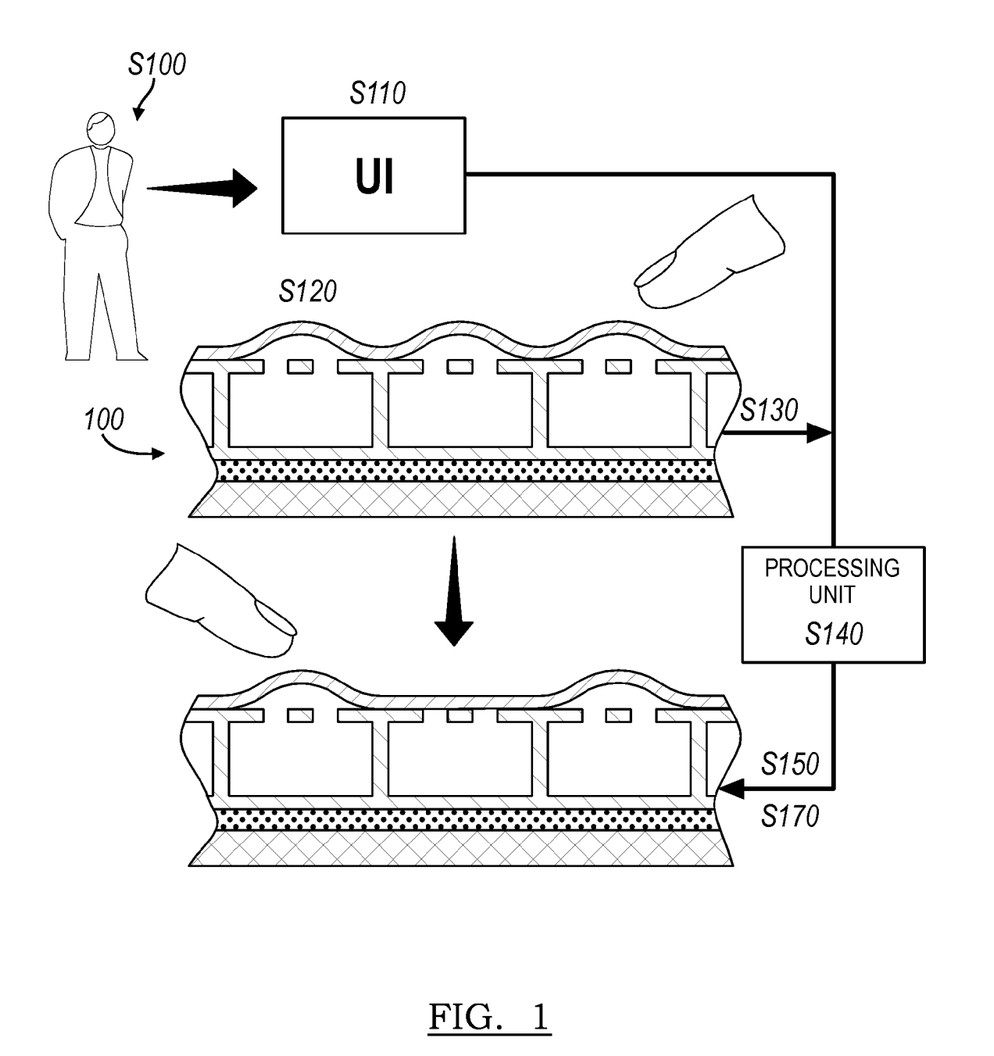
FIG. 1 is a schematic representation of the method of the preferred embodiments.
Figure 2:
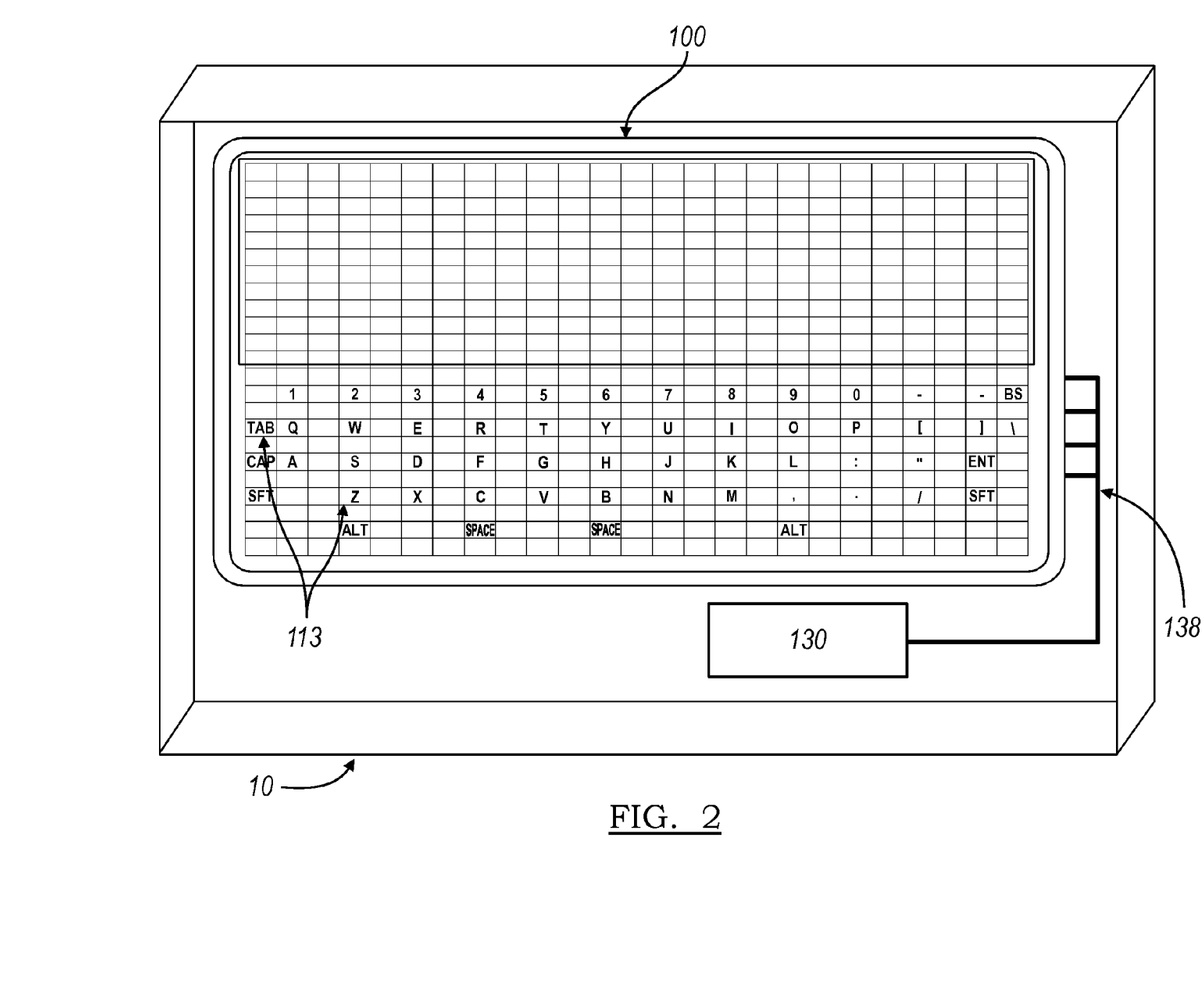
FIG. 2 is a top view of the user interface system of a preferred embodiment applied to a device.

As shown in FIGS. 1 and 2, the method S100 of the preferred embodiments for adjusting a user interface for a device preferably includes providing a user interface to retrieve a user input Step S110, providing a tactile interface layer that defines a surface and includes a volume of fluid and a displacement device that manipulates the volume of fluid to deform a plurality of particular regions of the surface into tactilely distinguishable formations that each represent a key of a keyboard Step S120, allowing the user to provide text input through the keyboard Step S130, predicting a subsequent key input when a user provides an input through the keyboard Step S140, and manipulating the volume of fluid to deform the plurality of particular regions into one of at least two types of tactilely distinguishable formations: a first type for tactilely distinguishable formations that correspond to a predicted key input and a second type for tactilely distinguishable formations that correspond to an unpredicted key input Step S150.

As shown in FIG. 1, after a user provides an input, a particular region that corresponds to a previously predicted key and is deformed into the first type of tactilely distinguishable formation may be transitioned into the second type of tactilely distinguishable formation (as shown for the middle particular region in FIG. 1) when the key corresponding to the particular region is an unpredicted key, providing the user with a substantially detectible tactile difference between a predicted key and an unpredicted key. Similarly, a particular region that corresponds to a previously unpredicted key and is deformed into the second type of tactilely distinguishable formation may be transitioned into the first type of tactilely distinguishable formation when the key corresponding to the particular region is a predicted key. By providing keys that are of two types of tactilely distinguishable formations based on the predicted subsequent input determined in Step S140, additional tactile assistance for text and/or number input is provided to the user. For example, the user may provide an input of the letter "t." The predicted subsequent key inputs may include the letters "h," "e," and/or "r," and an unpredicted key may include the letters "y," "d," and/or "q." The step of manipulating the volume of fluid to deform the plurality of particular regions S150 may include decreasing the height of the unpredicted letters "y," "d," and "q" while maintaining the height of the letters "h," "e," and "r." As a result, the user can tactilely distinguish between a predicted letter and an unpredicted letter. In this particular example, it may be particularly useful to tactilely distinguish between the letter "y" and the letter "h" because of their proximity on a typical QWERTY keyboard, facilitating the user in correctly inputting the letter "h" if desired as opposed to incorrectly inputting the letter "y." Additionally, because the "h" is now tactilely distinguishable from "y," a user may more accurately locate the letter "h" as opposed to the letter "y" without looking, for example, by determining the relative location of the desired key within the overall layout of the keyboard and subsequently feeling for the tactilely distinguishable formation in the determined location. The step of manipulating the volume of fluid to deform the plurality of particular regions S150 preferably manipulates the volume of fluid to deform the plurality of particular regions S150 if the predicted letters are not otherwise distinguishable from the unpredicted letters. For example, a predicted letter "F" may already have a distinguishable feature from, for example, an unpredicted letter "H," such as the nub as seen in typical keyboards and thus fluid may not be further manipulated to provide another distinguishable feature to the letter "F." However, any other suitable arrangement of the manipulation of fluid in Step S150 may be used.

As described above, the keyboard may be a letter keyboard that facilitates text input on a device 10, as shown in FIG. 2. However, the keyboard may alternatively be a number keypad, navigational arrows, directional input, volume input, playback control input, or any other suitable type of keyboard. For example, the keyboard may be a number keypad for a phone application. The step of predicting a subsequent key input S140 may include predicting a subsequent number input, such as in a "speed dial" application. In a second example, each key in the keyboard may represent a word or a phrase or any other suitable combination of letters, numbers, symbols, or any others suitable type of text unit. In this example, the step of predicting a subsequent key input Step S140 preferably includes predicting a subsequent word, phrase, or any other suitable combination of letters, numbers, symbols, and/or any other suitable type of text unit. A particularly notable example of such an input may include Chinese and Japanese text input where a key might represent a subsequent character or combination of characters. The step of manipulating the volume of fluid S150 may include deforming a particular region corresponding to a number associated with a stored speed dial number into the first type of tactilely distinguishable formation and deforming a particular region corresponding to a number that is not associated with a stored speed dial number into the second type of tactilely distinguishable formation. In another example, the keyboard may be the interface of a navigation device. The step of predicting a subsequent key input S140 may include predicting a subsequent letter and/or number of an address input based on a stored database of available addresses. This may provide tactile guidance that may facilitate navigational entry while in a vehicle or in any other suitable situation where the user may not be concentrating on the device 10 (for example, the user is operating the vehicle while entering a desired navigational entry). However, any other suitable type of device, predictive function, or keyboard may be used.

1. Providing a Tactile Interface Layer

Figure 3A:
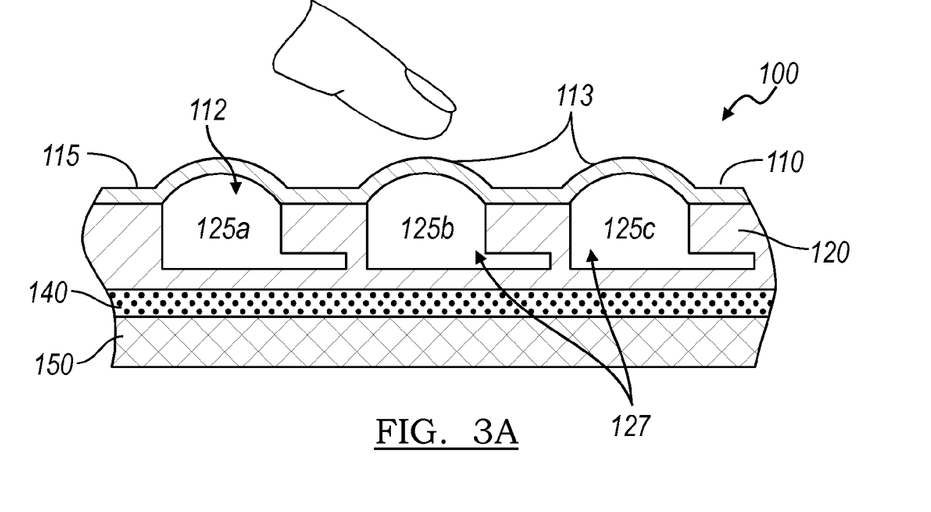
FIGS. 3a and 3b are cross-sectional views of the tactile interface layer of a first and second variation, respectively.
Figure 3B:
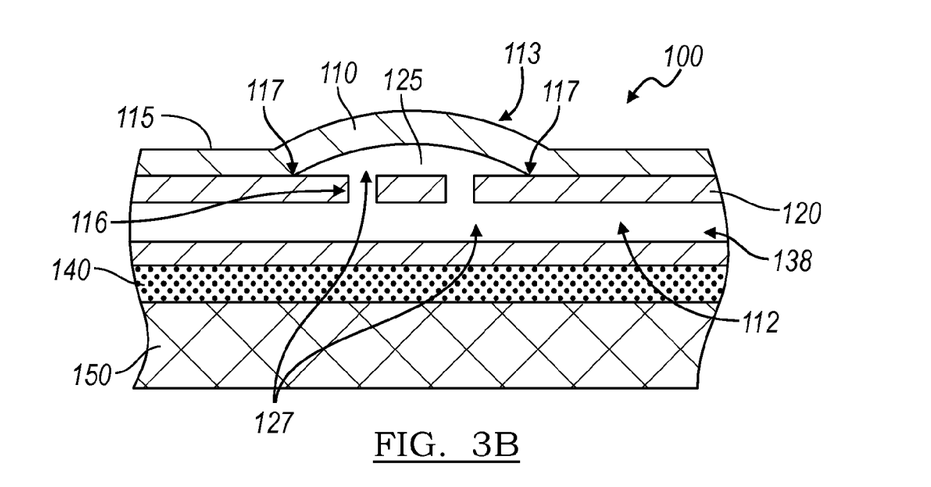
Figure 4A:
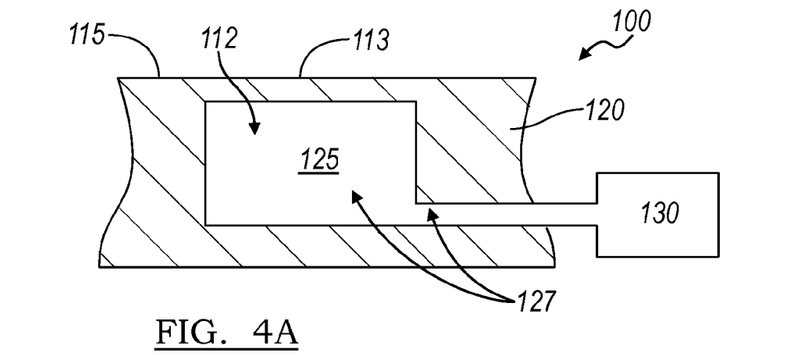
FIGS. 4a, 4b, and 4c are cross-sectional views illustrating the operation of a particular region of the surface of the tactile interface layer in accordance to the preferred embodiments.
Figure 4B:
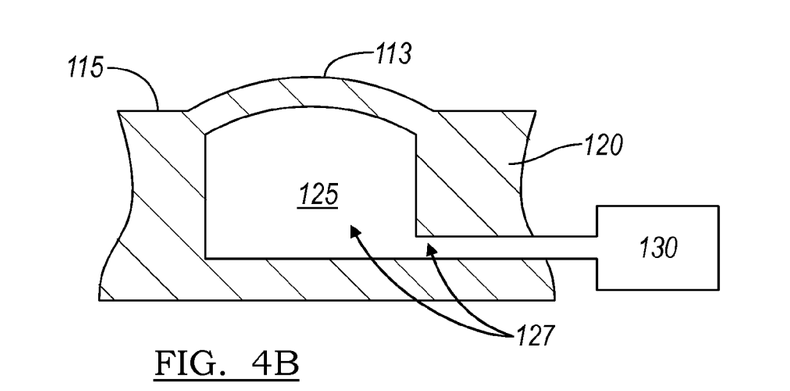
Figure 4C:
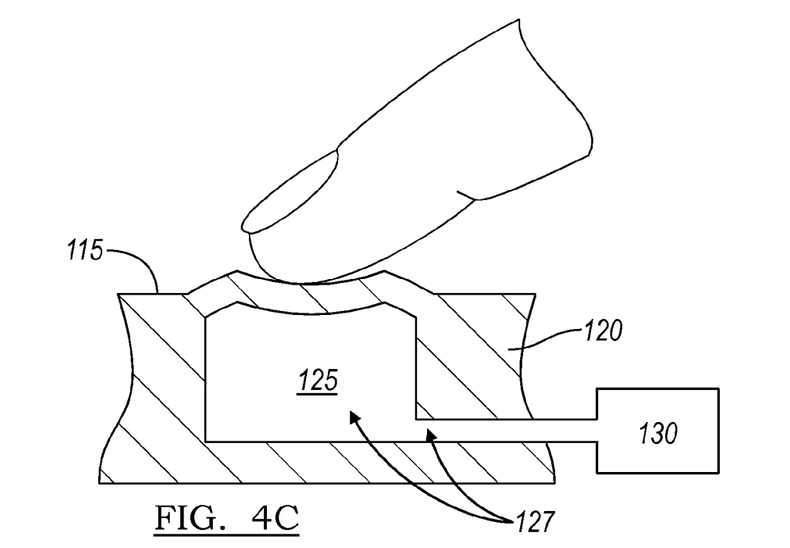
Figure 5:
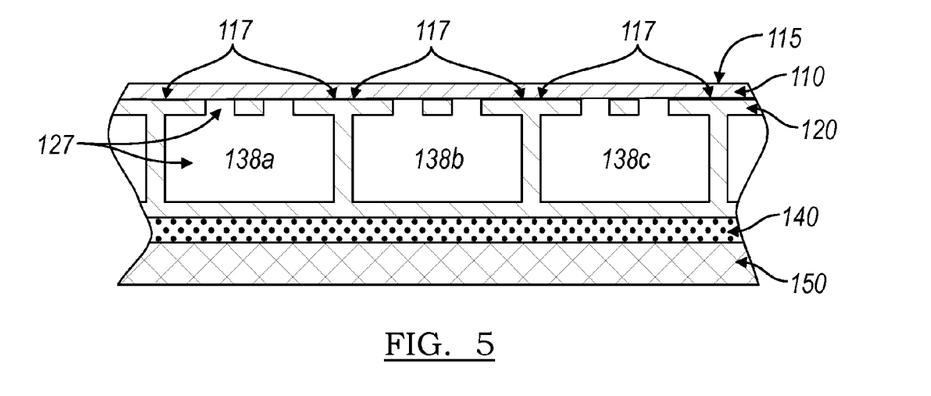
FIG. 5 is a schematic representation of a multi-channel variation of the tactile interface layer with undeformed particular regions of the surface.

As shown in FIGS. 2-7, the tactile interface layer 100 provided in Step S120 of the preferred embodiment includes: a layer 110 defining a surface 115, a substrate 120 supporting the layer 110 and at least partially defining a fluid vessel 127, and a displacement device 130 coupled to the fluid vessel 127 that influences the volume of fluid 112 within the fluid vessel 127 to expand and retract at least a portion of the fluid vessel 127, thereby deforming a particular region 113 of the surface 115. The surface 115 is preferably continuous, such that when swiping a finger across the surface 115 a user would not feel any substantial seams or any other type of interruption in the surface 115. Alternatively, the surface 115 may include features that facilitate the user in distinguishing one region from another. The surface 115 is also preferably planar. The surface 115 is preferably arranged in a flat plane, but may alternatively be arranged in a curved plane or on a first plane and then wrapped around to a second plane substantially perpendicular to the first plane, or any other suitable arrangement. The surface 115 may alternatively include lumps, bumps, depressions, textures, or may be a surface of any other suitable type or geometry. The fluid vessel 127 preferably includes a cavity 125 and the displacement device 130 preferably influences the volume of fluid 112 within the cavity 125 to expand and retract the cavity 125. The fluid vessel 127 may alternatively be a channel 138 or a combination of a channel 138 and a cavity 125, as shown in FIG. 3b. As shown in the variation shown in FIG. 3b, the substrate 120 preferably defines a fluid outlet 116 that allows fluid to flow between the channel 138 and the cavity 125 to deform and un-deform a particular region of the surface 113. The variation may also include a plurality of channels 138a, 138b, and 138c within the substrate 120, as shown in FIG. 5. The fluid outlet may be formed into the substrate, for example, the fluid outlet 116 may be a series of bores that are machined into the substrate in between the channel 138 and the cavity 125 (shown in FIG. 3b) or an open orifice between the cavity 125 and the channel 138 (shown in FIG. 3a), but may alternatively be a property of the material, for example, the substrate 120 may include a porous material that includes a series of interconnected cavities that allow fluid to flow through the substrate 120. The substrate 120 may define any suitable number of fluid outlets 116 that are of any suitable size and shape. The tactile interface layer may also include a fluid outlet layer (not shown) that defines the fluid outlets 116 that is separate from substrate 120 and arranged in between the substrate 120 and layer 110. However, any other suitable arrangement of the fluid outlets 116 may be used. As shown in FIG. 3b, the portion of the substrate 120 (or the fluid outlet layer) that includes the fluid outlets 116 may also function to provide a support for the layer 110 to substantially prevent the layer 110 from substantially depressing into the channel 138 when force is applied over the particular region 113. However, the substrate 120 may be arranged in any other suitable manner and may provide support for the layer 110 in any other suitable way.

The layer 110 is preferably attached to the substrate 120 (or fluid outlet layer) at an attachment point 117 that at least partially defines the size and/or shape of the particular region 113. In other words, the attachment point 117 functions to define a border between a deformable particular region of the surface 113 and the rest of the surface 115 and the size of the particular region 113 is substantially independent of the size of the cavity 124 and/or the channel 138. The attachment point 117 may be a series of continuous points that define an edge, but may alternatively be a series of non-continuous points. The attachment point 117 may be formed using, for example, adhesive, welding, or any other suitable attachment material and/or method. The method and material used to form the attachment point 117 is preferably of a similar optical property as the layer 110 and the substrate 120, but may alternatively be of any other optical property. Other portions of the layer 110 and substrate 120 not corresponding to a particular region of the surface 113 may also be adhered using similar or identical materials and methods to the attachment point 117. Alternatively, the layer 110 and substrate 120 may be left unattached in other portions not corresponding to a particular region of the surface 113. However, the layer 110 and the substrate 120 may be arranged in any other suitable manner.

The fluid vessel 127 may also include a second cavity 125b in addition to a first cavity 125a. When the second cavity 125b is expanded, a second particular region 113 on the surface 115 is preferably deformed. The displacement device 130 preferably influences the volume of fluid 112 within the second cavity 125b independently of the first cavity 125a, but may alternatively influence the volumes of fluid 112 within both the first cavity and second cavity 125a and 125b substantially concurrently. Alternatively, the user interface enhancement system 100 may include a second displacement device 130 that functions to influence the volume of fluid 112 within the second cavity 125b to expand and retract the second cavity 125b, thereby deforming a second particular region 113 of the surface. The second cavity 125b is preferably similar or identical to the cavity 125, but may alternatively be any other suitable kind of cavity. The following examples may be described as expanding a fluid vessel 127 that includes a cavity 125 and a channel 138, but the fluid vessel 127 may be any other suitable combination of combination of cavity 125 and/or channel 138. The tactile interface layer 100 may also include a display 150 coupled to the substrate 120 and adapted to output images to the user. As described above, the tactile interface layer 100 may also include a sensor 140 that functions to detect inputs from the user. The sensor 140 may be a capacitive sensor, a pressure sensor, a touch sensitive display, or any other suitable sensor type that detects the presence of a user input. The sensor 140 may be located within the fluid vessel 127, substantially adjacent to the fluid vessel 127 (as shown in FIGS. 3a and 3b), remote from the fluid vessel 127, remote from a cavity 125 but fluidly coupled to the fluid vessel 127, or in any other suitable location.

The tactile interface layer 100 of the preferred embodiments has been specifically designed to be used as the user interface for an electronic device 10, more preferably in an electronic device 10 that benefits from an adaptive user interface. The electronic device 10 may or may not include a display and/or a touch sensor, for example, an automotive console, a steering wheel, a desktop computer, a laptop computer, a tablet computer, a television, a radio, a desk phone, a mobile phone, a PDA, a personal navigation device, a personal media player, a camera, a watch, a remote control, a mouse, a trackpad, or a keyboard. The tactile interface layer 100 may, however, be used as the user interface for any suitable device 10 that interfaces with a user in a tactile and/or visual manner. The tactile interface layer 100 is preferably integrated with the device, for example, in the variation wherein the tactile interface layer 100 includes a sensor 140, the tactile interface layer 100 is preferably assembled into the device 10 and presented to the user as one unit. Alternatively, the tactile interface layer 100 may function as an accessory to a device 10, the user may be presented the tactile interface layer 100 and the device 10 as two separate units wherein, when coupled to each other, the tactile interface layer 100 functions to provide tactile guidance to the user and/or to receive user inputs. However, any other suitable arrangement of the tactile interface layer 100 may be used.

As shown in FIG. 4, the surface 115 of the tactile interface layer 100 preferably remains flat until tactile guidance is to be provided to the user at the location of the particular region 113. The displacement device 130 then preferably expands the cavity 125 to expand the particular region 113 outward, forming a deformation that may be felt by a user (referenced throughout this document as a "tactilely distinguishable formation"), and providing tactile guidance for the user. The expanded particular region 113 preferably also provides tactile feedback to the user when they apply force onto the particular region 113 to provide input. Alternatively, the displacement device 130 may retract the cavity 125 to deform the particular region 113 inward. However, any other suitable deformation of the particular region 113 may be used.

As shown in FIG. 4, the cavity 125 of the fluid vessel 127 of the preferred embodiment functions to hold a volume of fluid 112 and to have at least two volumetric settings: a retracted volume setting (shown in FIG. 4a) and an extended (or "deformed") volume setting (shown in FIG. 4b). Additionally, there may be a plurality of volume settings or a dynamic range of volume settings. As the user provides an input in Step S130, the extended or deformed particular region of the surface is inwardly deformed (shown in FIG. 4c). The fluid 112 is preferably a substantially incompressible fluid, but may alternatively be a compressible fluid. The fluid 112 is preferably a liquid (such as water, oil, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 deforms the particular region 113 of the surface 115 above the plane of the other regions of the surface 115. When used with a mobile phone device, the deformation of the particular region 113 preferably has a diameter of 2-10 mM and the cavity 125 may be of a substantially equal diameter as the deformation of the particular region 113 or may be of a smaller or larger diameter. When used with this or other applications, however, the cavity 125 may have any suitable dimension.

The displacement device 130 of the preferred embodiment functions to influence the volume of the fluid 112 with the fluid vessel 127 to expand and retract at least a portion of the fluid vessel 127, thereby deforming a particular region 113 (and/or a second particular region 113) of the surface 115. When used with a mobile phone device, the displacement device 130 preferably increases the volume of the fluid 112 within the fluid vessel 127 by approximately 0.003-0.1 ml to expand the cavity 125 to outwardly deform a particular region 113. When used with this or other applications, however, the volume of the fluid may be increased (or possibly decreased) by any suitable amount. The displacement device 130 preferably modifies the volume of the fluid 112 by (1) modifying the volume of the existing fluid 112 in the fluid vessel 127, or (2) adding and removing fluid 112 to and from the fluid vessel 127. The displacement device 130 may, however, influence the volume of the fluid 112 by any suitable device or method. Modifying the volume of the existing fluid 112 in the fluid vessel 127 most likely has an advantage of lesser complexity, while adding and removing fluid 112 to and from the fluid vessel 127 most likely has an advantage of maintaining the deformation of the surface 115 without the need for additional energy (if valves or other lockable mechanisms are used). Although the cause of the deformation of a particular region 113 of the surface 115 has been described as a modification of the volume of the fluid in the fluid vessel 127, it is possible to describe the cause of the deformation as an increase or decrease in the pressure below the surface 115 relative to the pressure above the surface 115. When used with a mobile phone device, an increase of approximately 0.1-10.0 psi between the pressure below the layer 110 relative to the pressure above the layer no, is preferably enough to outwardly deform a particular region 113 of the surface 115. When used with this or other applications, however, the modification of the pressure may be increased (or possibly decreased) by any suitable amount.

The shape of the deformation of the particular region 113 is preferably one that is felt by a user through their finger and preferably acts as (i) a button that can be pressed by the user, (2) a slider that can be pressed by the user in one location along the slider or that can be swept in a sliding motion along the slider (such as the "click wheel" of the second generation Apple iPod), and/or (3) a pointing stick that can be pressed by the user from multiple directions and/or locations along the surface whereby the user is provided with tactile feedback that distinguishes a first directional touch from a second directional touch and/or a touch in a first location from a touch in a second location (such as the pointing stick trademarked by IBM as the TRACKPOINT and by Synaptics as the TOUCHSTYK, which are both informally known as the "nipple"). The deformation may, however, act as any other suitable device or method that provides suitable tactile guidance and feedback. In the variation including a display 150, the shape of the deformation of the particular region 113 also preferably functions to minimize the optical distortion of the image underneath the deformed particular region 113.

2. Predicting a Subsequent Key Input

The step of predicting a subsequent key input when a user provides an input through the keyboard Step S140 preferably functions to predict the next input that the user desires to provide, allowing the tactile interface layer 100 to adjust the arrangement of the particular regions corresponding to inputs in Step S150 and to provide additional tactile guidance to the user. The step of predicting a subsequent key input S140 may include the step of assigning a rank to each possible input and predicting the subsequent key input with the highest rank. The rank may be assigned based upon the frequency of the possible combinations of the provided input and the subsequent input. For example, in the variation of the tactile interface layer 100 that provides a text keyboard to be used to input English, for an input of the letter "t," the subsequent input of the letter "h" would be assigned a substantially high rank and would be provided as a predicted subsequent key because of the number of possible words that begin with the letters "th." However, any other suitable ranking may be assigned to each possible subsequent key input. Alternatively, the step of predicting a subsequent key input S140 may also include the step of storing historical inputs provided by the user and predicting a subsequent key input based on the historical inputs provided by the user. The step of storing historical inputs may include storing the historical inputs from a plurality of users, for example, the inputs provided onto a particular device by a plurality of users may be stored in a central database that may be referenced by the devices to predict a subsequent key input. However, any other suitable type of historical input may be stored and/or used. This may be particularly useful in allowing the predictive input function to accommodate to individual users and their input habits. For example, in the variation of the tactile interface layer 100 that provides a text keyboard to be used to input English, the popular greeting "Yo" is not a standard English word, and may be misinterpreted by the predictive text function to be the word "You." If the user inputs "Yo" and is provided with a predicted subsequent key of the letter "u" and selects to ignore the prediction, then the step of storing historical inputs provided by the user will store the user's historical input of "Yo" as opposed to "You" and utilize this information in predicting subsequent inputs in the future. The step of storing historical inputs may also include applying and/or adjusting a prediction rank based on the historical input. For example, "You" may still have a higher prediction rank than "Yo," but as the number of occurrences of the user inputting the word "Yo" increases, the prediction rank of "Yo" also increases.

In a second example of the step of predicting a subsequent key input S140, the number of possible combination of words and/or numbers available within a database will decrease as the user inputs additional characters. In a particular application in a navigation device that includes a database of available addresses, as a user inputs a first letter or number, the keys that correspond to a possible subsequent letter or number from the addresses stored within the database may be presented to the user. As a subsequent letter is presented, the number of possible subsequent letter or numbers will decrease as the address is narrowed down from the full database of addresses available in the navigation device. In this example, a subsequent letter may not be assigned a ranking and each available address within the database may be thought of as of having the same ranking. Alternatively, a more frequently visited address may be assigned a higher ranking than a less frequently visited address. Alternatively, an address that is substantially closer in proximity to the location of the user may be assigned a higher ranking than an address that is substantially farther away. However, any other suitable method of predicting a subsequent key input may be used.

3. Manipulating the Volume of Fluid

Figure 6:
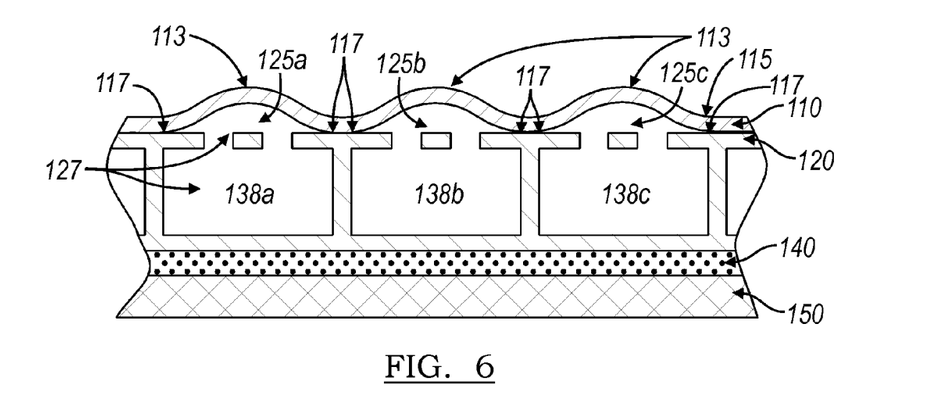
FIG. 6 is a schematic representation of a first type and a second type of tactilely distinguishable formation of a first variation.
Figure 7:
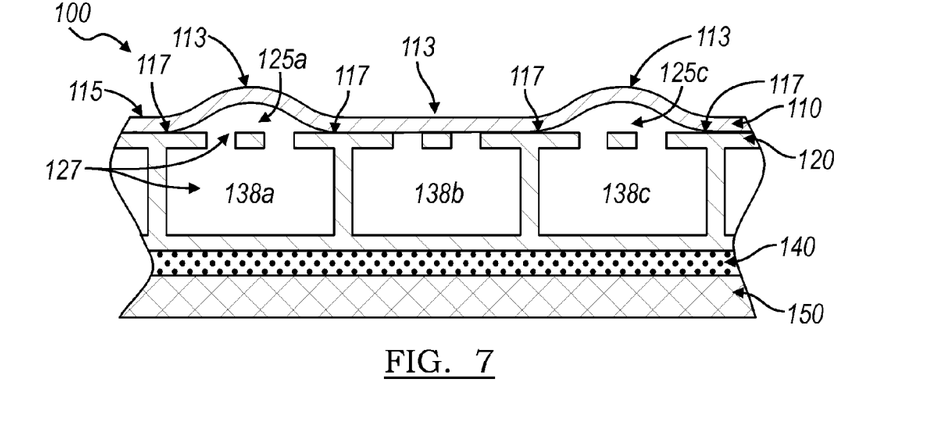
FIG. 7 is a schematic representation of a first type and a second type of tactilely distinguishable formation of a second variation.

The step of manipulating the volume of fluid to deform the plurality of particular regions into one of at least two types of tactilely distinguishable formations: a first type for tactilely distinguishable formations that represent a predicted key and a second type for tactilely distinguishable formations that represent an unpredicted key Step S150 functions to change the arrangement of the particular regions 113 of the surface to provide additional tactile guidance to the user in providing input. The first type and second type of tactilely distinguishable formations are preferably distinguishable from each other such that the user can substantially determine a tactilely distinguishable formation of a first type from a second type without looking. The first type and the second type of tactilely distinguishable formations may be distinguishable in one of several variations. In a first variation, the first type of tactilely distinguishable formation is stiffer than the second type of tactilely distinguishable formation. For example, the pressure of the fluid within the cavities 125 corresponding to particular regions that represent unpredicted keys may be of a lower pressure than the fluid within the cavities 125 corresponding to particular regions that represent predicted keys. In a second variation, the first type of tactilely distinguishable formation is of a first shape and the second type of tactilely distinguishable formation is of a second shape. For example, the first type of tactilely distinguishable formation may be of a height that is taller than the second type of tactilely distinguishable formation, as shown in FIG. 6, as the height difference between cavities 125a and 125c and cavity 125b. Alternatively, the height of the second type of tactilely distinguishable formation may be substantially zero relative to the surface, as shown in FIG. 7. In this variation, the second type of tactilely distinguishable formation may be alternatively described as substantially tactilely indistinguishable from the surface 115 and the first type of tactilely distinguishable formation may be alternatively described as substantially tactilely distinguishable from the surface 115. Alternatively, the second variation of the first and second types of tactilely distinguishable formations may include a first type that is of a square shape while a second type that is of a dome shape. Yet alternatively, the second variation of the first and second types of tactilely distinguishable formations may include a first type that is of a first diameter and/or width and a second type that is of a smaller diameter and/or width. The first and second types of tactilely distinguishable formations may also be a combination of the above variations. For example, the first type may be of a first shape and a first height while the second type may be of a second shape and a second height. In a third variation, the first type of tactilely distinguishable formation is deformed in a first sequence and the second type of tactilely distinguishable formation is deformed in a second sequence. For example, the first type of tactilely distinguishable formation may be deformed into a shape in a substantially constant sequence (e.g., the shape of the tactilely distinguishable formation does not change substantially) and the second type of tactilely distinguishable formation may be deformed in a substantially pulsating sequence (e.g., the shape of the tactilely distinguishable formation changes cyclically). However, any other type of deformation sequence may be used. However, any other suitable types of tactilely distinguishable formations may be used to distinguish the first type from the second type.

The transition between the first and second types of tactilely distinguishable formations may also be one of several variations. In a first variation, a particular region that corresponds to a previously predicted key and is deformed into the first type of tactilely distinguishable formation may be transitioned into the second type of tactilely distinguishable formation (as shown for cavity 125b in FIG. 6) when the key corresponding to the particular region is an unpredicted key. In a second variation, a particular region that corresponds to a previously unpredicted key and is deformed into the second type of tactilely distinguishable formation may be transitioned into the first type of tactilely distinguishable formation when the key corresponding to the particular region is a predicted key. The first and second variations may be combined to transition between predicted and unpredicted keys. In a usage scenario, when the keyboard is actuated, the user has not provided an input using the keyboard and, by default, all keys may be a predicted key. As a result, each key of the keyboard is deformed into a tactilely distinguishable formation of the first type. After the user provides a first key input, a subsequent key prediction is made and the previously raised keys that are now unpredicted keys are deformed into the second type of tactilely distinguishable formation. After a second key input is provided by the user, a second subsequent key is predicted and the arrangement of the particular regions is again changed such that previously unpredicted keys in the second type of tactilely distinguishable formation may be transitioned into predicted keys in the first type of tactilely distinguishable formation and previously predicted keys in the first type of tactilely distinguishable formation may be transitioned into unpredicted keys in the second type of tactilely distinguishable formation. The transition of particular regions from the first type to the second type of tactilely distinguishable formations may occur concurrently with the transition of particular regions from the second type to the first type of tactilely distinguishable formations to decrease the time of transition. However, any other timing of the transitions may be used.

In a third variation of transition, each tactilely distinguishable formation may return to an original state (for example, the flat surface 115 as shown in FIG. 5) before re-deforming into the desired first and second types of tactilely distinguishable formations. This may decrease the complexity of the system. For example, the displacement device 130 is first removing fluid from the cavities 125 and then displacing fluid back into the cavities 125 as opposed to removing fluid from some cavities 125 while displacing fluid into other cavities 125. Alternatively, in a fourth variation of transition, particular regions that are to transition from the first type of tactilely distinguishable formation into the second type may be transitioned first and then those particular regions that are to transition from the second type of tactilely distinguishable formation into the first type may be transitioned second (or in reverse order) such that fluid is moving in generally one direction at one time. However, any other transition type may be used.

The actuation of the deformation of each particular region 113 of the surface 115 may include implementation of a fluid network and/or valves, such as that described in U.S. application Ser. No. 12/652,704 filed on 5 Jan. 2010 and entitled "User Interface System," which is incorporated in its entirety by this reference, that allow the cavities 125 to be expanded substantially individually. In a first example, in the variation where the second type of tactilely distinguishable formation is of a smaller volume than the first type of tactilely distinguishable formation, the fluid network may function to displace fluid from those particular regions transitioning from the first type of tactilely distinguishable formation to the second type to those particular regions transitioning from the second type of tactilely distinguishable formation to the first type. Alternatively, in a second example, the fluid network may function to displace fluid from those particular regions transitioning from the first type of tactilely distinguishable formation to the second type to a reservoir and to displace fluid from the reservoir to those particular regions transitioning from the second type of tactilely distinguishable formation to the first type of tactilely distinguishable formation. However, any other suitable type of fluid flow within the tactile interface layer 100 may be used.

4. Variations of the Preferred Embodiments

The method S100 of the preferred embodiments may also include the step of manipulating the device 10 to provide a notification of a first type for a predicted key and a notification of a second type for an unpredicted key S170. Combining the notification provided by the device 10 and the tactile guidance provided by the tactile interface layer 100 may further assist the user in entering their desired input in a potentially faster manner. In a first variation, the step of manipulating the device 10 to provide a notification may include manipulating the device 10 to provide a notification to assist the user in selecting a particular key prior to input. In a first example, the device 10 may include a display 150 and the step of manipulating the device 10 to provide a notification includes manipulating the device to provide a visual guide to the user. In a first example the display 150 may display an image corresponding to each particular region that cooperates with the tactile interface layer 100 to represent a keyboard. The first type of notification may be a brighter image or a first color for a predicted key and a less bright or a second color image for an unpredicted key, thus providing additional visual assistance to the user. Alternatively, in the variation where the first and second types of tactilely distinguishable formations are distinct in diameter and/or width, the corresponding image may emulate the width of the tactilely distinguishable formation. In a second variation, the step of manipulating the device 10 to provide a notification may include manipulating the device to provide a notification when an input is detected. In a first example, the device may include a speaker that produces a sound of a first type when a predicted key is selected and a sound of a second type (for example, less loud) when an unpredicted key is selected. In another example, the device may include a vibration inducer that provides a vibration of a first magnitude when a predicted key is selected and a vibration of a second magnitude (for example, lower magnitude), when an unpredicted key is selected. However, the device 10 may provide any other suitable type of notification.

As a person skilled in the art will recognize from the previous detailed description and from the figures and claims, modifications and changes can be made to the preferred embodiments of the invention without departing from the scope of this invention defined in the following claims.

We claim:

1. A method for assisting user input, comprising:
    displaying a set of keys on a display coupled to a substrate, the substrate coupled to an undeformable region of a tactile layer, the tactile layer comprising a set of deformable regions adjacent the undeformable region, each deformable region in the set of deformable regions disconnected from the substrate, configured to deform into a tactile formation above the undeformable region, and corresponding to a key in the set of keys;
    receiving a selection of a first key in the set of keys;
    predicting a selection of a subsequent key based on the selection of the first key, the subsequent key corresponding to a first deformable region in the set of deformable regions; and
    manipulating a volume of fluid to transition the first deformable region into a first tactile formation and to transition a second deformable region, in the set of deformable regions, into a second tactile formation, the first tactile formation tactilely distinguishable from the second tactile formation, the second deformable region corresponding to an unpredicted subsequent key; and
    enabling selection of the predicted subsequent key through the first deformable region and selection of the unpredicted subsequent key through the second deformable region.

2. The method of claim 1, further comprising generating a notification of a first type for the predicted subsequent key and a notification of a second type for the unpredicted subsequent key.

3. The method of claim 2, wherein generating the notification of the first type and the notification of the second type comprises generating the notification of the first type in response to an input detected at the first region in the first formation and generating the notification of the second type in response to an input detected at the first region in the second formation.

4. The method of claim 3, wherein the dynamic user interface further comprises a speaker, wherein generating the notification of the first type comprises generating a first sound and wherein generating the notification of the second type comprises generating a second sound of a magnitude less than that of the first sound.

5. The method of claim 3, wherein the dynamic user interface further comprises a vibration inducer, wherein generating the notification of the first type comprises generating a first vibration and wherein generating the notification of the second type comprises generating a second vibration of a magnitude greater than that of the first vibration.

6. The method of claim 1, wherein predicting the selection of the subsequent key comprises accessing historical user inputs and predicting the subsequent key based on the historical user inputs.

7. The method of claim 6, wherein predicting the selection of the subsequent key comprises applying a prediction rank to the historical user inputs based on a frequency of the historical user inputs.

8. The method of claim 7, wherein applying the prediction rank to the stored historical user inputs comprises applying a higher prediction rank to a user input provided by the user at a higher frequency.

9. The method of claim 1, wherein each deformable region in the set of deformable regions cooperates with the substrate to define a cavity in a set of cavities, a cavity in the set of cavities configured to communicate fluid to a deformable region in the set of deformable regions to transition the deformable region between elevated positions above the undeformable region, wherein manipulating the volume of fluid to transition comprises displacing a greater volume of fluid into a cavity corresponding to the first deformable region than into a cavity corresponding to the second deformable region.

10. The method of claim 1, wherein manipulating the volume of fluid comprises expanding the first deformable region into a distended feature of a first height above the undeformable region and retracting the second deformable region to a second height substantially flush with the undeformable region.

11. The method of claim 1, wherein manipulating the volume of fluid comprises expanding the first deformable region from substantially flush with the undeformable region to an elevated position above the undeformable region, the second deformable region remaining substantially flush with the undeformable region.

12. The method of claim 1, wherein manipulating the volume of fluid comprises transitioning the first deformable region from a first footprint to a second footprint area larger than the first footprint area and transitioning the second deformable region from a third footprint to a fourth footprint area smaller than the third footprint area.

13. The method of claim 12, wherein displaying the set of keys comprises displaying the subsequent key as an image of a first size according to the first footprint area of the first deformable region, and further comprising displaying the subsequent key as an image of a second size according to the second footprint area of the first deformable region.

14. The method of claim 1, wherein manipulating the volume of fluid comprises transitioning the first deformable region from a first stiffness to a second stiffness greater than the first stiffness.

15. The method of claim 1, wherein manipulating the volume of fluid comprises transitioning the first deformable region from a first three-dimensional shape to a second three-dimensional shape tactilely distinguishable from the first three-dimensional shape in the second keyboard position.

16. The method of claim 1, further comprising predicting the selection of a second subsequent key based on the selection of the first key, a probability of selection of the subsequent key greater than a probability of selection of the second subsequent key, the second subsequent key corresponding to a third deformable region, wherein manipulating the volume of fluid further comprises manipulating the volume of fluid to transition the third deformable region into a third tactile formation tactilely distinguishable from the first and second tactile formations.

17. The method of claim 16, wherein manipulating the volume of fluid comprises transitioning the first deformable region to a first height above the undeformable region, transitioning the second deformable region to a second height substantially flush with the undeformable region, and transitioning the third deformable region to a third height between the first height and the second height above the undeformable region.

18. The method of claim 16, wherein enabling selection of the predicted subsequent and selection of the unpredicted subsequent key comprises simultaneously setting as active a first area of a touch sensor coupled to the substrate and corresponding to the predicted subsequent key and setting as active a second area of the touch sensor corresponding to the unpredicted subsequent key, the touch sensor configured to detect an input on each deformable region in the set of deformable regions.

19. A method for assisting user input, comprising:
- manipulating a volume of fluid to transition a dynamic user interface into a first keyboard position, the dynamic user interface comprising a substrate coupled to an undeformable region of a tactile layer, the tactile layer comprising a set of deformable regions adjacent the undeformable region, each deformable region in the set of deformable configured to transition between elevated positions relative to the undeformable region, wherein a subset of deformable region in the set of deformable regions is arranged at a first elevated position in the first keyboard position;
- displaying a set of keys on a display coupled to the substrate, each key in the set of keys defining an input region and corresponding to a deformable region in the set of deformable regions;
- receiving a selection of a first key in the set of keys through a touch sensor coupled to the substrate;
- predicting a selection of a subsequent key based on the selection of the first key;
- manipulating the volume of fluid to transition the dynamic user interface into a second keyboard position, a first deformable region corresponding to the subsequent key arranged at the first elevated position and a second deformable region corresponding to an unpredicted subsequent key arranged at a second elevated position tactilely distinguishable from the first elevated position in the second keyboard position; and
- in the second keyboard position, enabling selection of the predicted subsequent key through the first deformable region and selection of the unpredicted subsequent key through the second deformable region.

20. The method of claim 19, wherein each deformable region in the set of deformable regions cooperates with the substrate to define a cavity in a set of cavities, a cavity in the set of cavities configured to communicate fluid to a deformable region in the set of deformable regions to transition the deformable region between elevated positions above the undeformable region, wherein manipulating the volume of fluid to transition the dynamic user interface into the second keyboard position comprises displacing a greater volume of fluid into a cavity corresponding to the first deformable region than into a cavity corresponding to the second deformable region.

21. The method of claim 19, wherein manipulating the volume of fluid to transition the dynamic user interface into the second keyboard position comprises transitioning the second deformable region from the first elevated position in the first keyboard position to a second elevation less than the first elevated position in the second keyboard position.

22. The method of claim 19, wherein displacing fluid through the fluid channel to transition the dynamic user interface into the first keyboard position comprises transitioning the set of deformable regions to a first position that is substantially flush with the undeformable region, and wherein displacing fluid through the fluid channel to transition the dynamic user interface into the second keyboard position comprises retracting the second deformable region to a position offset below the undeformable region.

* * * * *

UNITED STATES PATENT AND TRADEMARK OFFICE
CERTIFICATE OF CORRECTION

PATENT NO. : 8,619,035 B2
APPLICATION NO. : 13/024241
DATED : December 31, 2013
INVENTOR(S) : Craig Michael Ciesla, Micah B. Yairi and Nathaniel Mark Saal It is certified that error appears in the above-identified patent and that said Letters Patent is hereby corrected as shown below:

In the Claims
Claim 1, Column 11, line 28, delete "and"
Claim 15, Column 12, line 52, replace "the" with --a--
Claim 18, Column 13, line 5, add --key-- between "subsequent" and "and"
Claim 19, Column 13, line 20, add --regions-- between "deformable" and "configured"
Claim 19, Column 13, line 22, "region" should read --regions--

Signed and Sealed this
Twenty-first Day of October, 2014

Michelle K. Lee
*Deputy Director of the United States Patent and Trademark Office*